(12) United States Patent
Ogawa

(10) Patent No.: US 10,414,214 B2
(45) Date of Patent: Sep. 17, 2019

(54) RUN-FLAT TIRE

(71) Applicant: BRIDGESTONE CORPORATION, Chuo-ku, Tokyo (JP)

(72) Inventor: Gaku Ogawa, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 14 days.

(21) Appl. No.: 15/111,816

(22) PCT Filed: Jan. 7, 2015

(86) PCT No.: PCT/JP2015/050274
§ 371 (c)(1),
(2) Date: Jul. 15, 2016

(87) PCT Pub. No.: WO2015/115140
PCT Pub. Date: Aug. 6, 2015

(65) Prior Publication Data
US 2016/0325591 A1 Nov. 10, 2016

(30) Foreign Application Priority Data
Jan. 28, 2014 (JP) .................................. 2014-013597

(51) Int. Cl.
*B60C 17/00* (2006.01)
*B60C 9/02* (2006.01)
(Continued)

(52) U.S. Cl.
CPC ............ *B60C 17/0009* (2013.01); *B60C 9/02* (2013.01); *B60C 11/00* (2013.01);
(Continued)

(58) Field of Classification Search
CPC ..... B60C 17/0009; B60C 13/00; B60C 17/00; B60C 17/0036; B60C 17/0018;
(Continued)

(56) References Cited

U.S. PATENT DOCUMENTS 5,217,549 A * 6/1993 Johnson .................... B60C 9/09
152/517
5,299,615 A * 4/1994 Ataka ...................... B60C 13/00
152/454

(Continued)

FOREIGN PATENT DOCUMENTS

| JP | 2001-322410 A | 11/2001 |
| JP | 2006-182294 A | 7/2006 |
| JP | 2012-116212 A | 6/2012 |
| JP | 2013-177115 A | 9/2013 |

*Primary Examiner* — Jodi C Franklin
(74) *Attorney, Agent, or Firm* — SOLARIS Intellectual Property Group, PLLC

(57) ABSTRACT

A run-flat tire includes a carcass, a tire side portion and a side reinforcement layer. The carcass bridges between a pair of bead portions. The tire side portion links between a bead portion and a tread portion. A carcass maximum width position of the tire side portion, at which the width of the carcass is at a maximum, is provided at the tire radial direction outer side relative to a position that is at 40% of the tire section height. The side reinforcement layer is provided at the tire width direction inner side of the carcass. A thickness of the side reinforcement layer at the position that is at 40% of the tire section height is not more than 65% of a thickness of the side reinforcement layer at the carcass maximum width position.

11 Claims, 4 Drawing Sheets

(51) Int. Cl.
*B60C 11/00* (2006.01)
*B60C 15/06* (2006.01)
*B60C 13/00* (2006.01)
*B60C 15/00* (2006.01)

(52) U.S. Cl.
CPC ...... *B60C 15/0603* (2013.01); *B60C 17/0027* (2013.01); *B60C 2013/007* (2013.01); *B60C 2015/009* (2013.01); *B60C 2015/061* (2013.01); *B60C 2017/0072* (2013.01)

(58) Field of Classification Search
CPC ............ B60C 17/0027; B60C 17/0045; B60C 2009/0035; B60C 2015/0696
See application file for complete search history.

(56) References Cited

U.S. PATENT DOCUMENTS

| | | | | |
|---|---|---|---|---|
| 5,685,927 | A * | 11/1997 | Hammond | B60C 3/00 152/209.26 |
| 2002/0000279 | A1 | 1/2002 | Tobino et al. | |
| 2003/0116249 | A1 | 6/2003 | Tobino et al. | |
| 2010/0288410 | A1* | 11/2010 | Mori | B29D 30/0681 152/209.18 |
| 2012/0103494 | A1* | 5/2012 | Shinzawa | B60C 15/0603 152/516 |
| 2012/0132338 | A1 | 5/2012 | Horiuchi | |
| 2013/0056127 | A1* | 3/2013 | Schreurs | B60C 17/0009 152/548 |
| 2013/0199688 | A1 | 8/2013 | Nakazaki | |

* cited by examiner

US 10,414,214 B2

RUN-FLAT TIRE

TECHNICAL FIELD

The present invention relates to a side-reinforced type run-flat tire.

BACKGROUND ART

As a run-flat tire that may run safely for a certain distance in a state in which internal pressure is reduced due to a puncture or the like, Japanese Patent Application Laid-Open (JP-A) No. 2012-116212 discloses a side-reinforced type run-flat tire in which a tire side portion is reinforced by a side-reinforcing rubber (a tire reinforcement layer).

SUMMARY OF INVENTION

Technical Problem

By the way, during running with a side-reinforced type run-flat tire in the state in which the internal pressure is reduced (run-flat running), when the vehicle is steered or the like and a slip angle is applied, there may be buckling in which a tire side portion buckles to the inner side of the tire. Buckling is particularly likely to occur at a run-flat tire in which a tire section height (section height) is large; tension forces act on the side-reinforcing rubber because of this buckling.

An object of the present invention is to, in a run-flat tire with a large tire section height (section height), suppress tension forces acting on a side reinforcement layer when buckling occurs at a tire side portion.

Solution to Problem

A run-flat tire according to a first aspect of the present invention is a run-flat tire with a tire section height of at least 115 mm, the run-flat tire including: a carcass bridging between a pair of bead portions; a tire side portion that links one of the bead portions with a tread portion, a carcass maximum width position of the tire side portion, at which a width of the carcass is at a maximum, being disposed at the tire radial direction outer side relative to a position at 40% of the tire section height; and a side reinforcement layer provided at a tire width direction inner side of the carcass, a thickness of the side reinforcement layer at the position at 40% of the tire section height being at most 65% of a thickness thereof at the carcass maximum width position.

Advantageous Effects of Invention

With the structure described above, the present invention may, in the run-flat tire with a large tire section height (section height), suppress tension forces acting on the side reinforcement layer when buckling occurs at the tire side portion.

DESCRIPTION OF EMBODIMENTS

—Structure of Run-Flat Tire 10—

Figure 1:
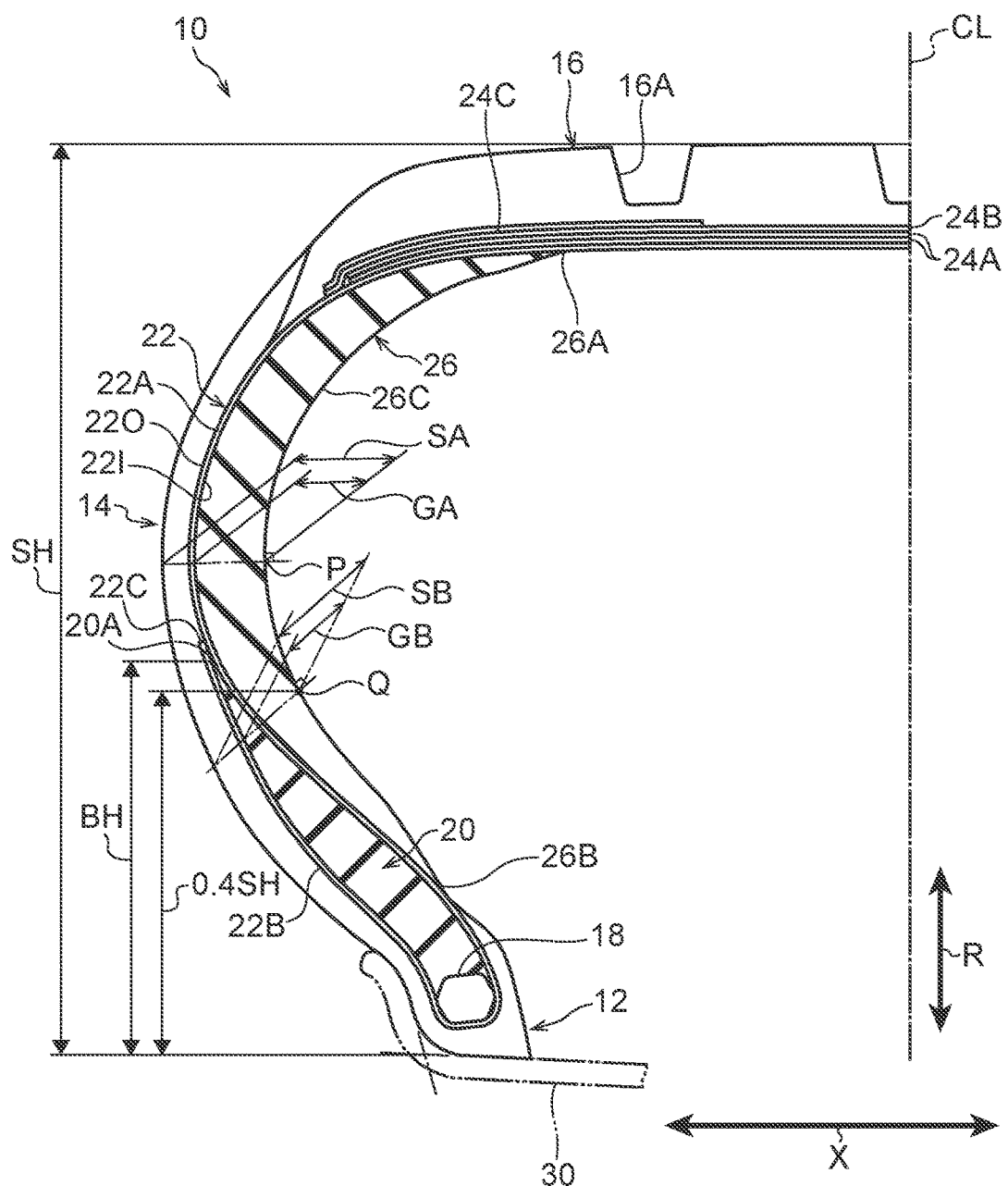
FIG. 1 is a tire half-section diagram showing one side of a sectional plane in which a run-flat tire in accordance with an exemplary embodiment of the present invention is cut along the tire axial direction.

Herebelow, a run-flat tire 10 (below referred to as "the tire 10") according to an exemplary embodiment of the present invention is described while referring to the attached drawings. In the drawings, the arrow X indicates a width direction of the tire 10 (the tire width direction), and the arrow R indicates the diametric direction of the tire 10 (the tire radial direction). The meaning of the term "tire width direction" as used herein includes directions parallel to a rotation axis of the tire 10, and is also referred to as "the tire axial direction". The meaning of the term "tire radial direction" includes directions orthogonal to the rotation axis of the tire 10. The symbol CL indicates an equatorial plane of the tire 10 (the tire equatorial plane). In the present exemplary embodiment, the rotation axis side of the tire radial direction of the tire 10 is recited as "the tire radial direction inner side", and the opposite side from the rotation axis of the tire radial direction of the tire 10 is recited as "the tire radial direction outer side". The equatorial plane CL side of the tire width direction of the tire 10 is recited as "the tire width direction inner side", and the opposite side from the equatorial plane CL side of the tire width direction of the tire 10 is recited as "the tire width direction outer side".

FIG. 1 shows one side of a section, cut along the tire width direction, of the tire 10 when mounted to a standard rim 30 (shown by the two-dot chain lines in FIG. 1) and filled to a standard air pressure. The standard rim referred to here is a rim specified in the Japan Automobile Tire Manufacturers Association, Inc. (JATMA) Year Book 2013. The standard tire pressure mentioned above is an air pressure corresponding to a maximum load capacity in the JATMA Year Book 2013. Outside Japan, the term "weight" refers to the maximum weight (maximum load capacity) on a single wheel of an applicable size recited in the below-mentioned standards, the term "internal pressure" refers to an air pressure corresponding to the maximum weight (maximum load capacity) on a single wheel recited in the below-mentioned standards, and the term "rim" refers to a standard rim (or "approved rim" or "recommended rim") with an applicable size recited in the below-mentioned standards. These standards are defined by the applicable industrial standards in the regions in which tires are manufactured and used. For example, in the United States of America, the standards defined in the Year Book of The Tire and Rim Association Inc., in Europe, the Standards Manual of the European Tire and Rim Technical Organization, and in Japan, the JATMA Year Book.

The tire 10 according to the present exemplary embodiment is a tire with a tire section height SH (section height) of at least 115 mm and an aspect ratio of at least 55%, but the present invention is not limited to this structure; the aspect ratio may be less than 55%. The term "tire section height" as used herein refers to half the difference in length between the tire outer diameter and the rim diameter, as defined in the JATMA Year Book 2013.

As shown in FIG. 1, the tire 10 according to the present exemplary embodiment is provided with a pair of bead portions 12 (only the bead portion 12 at the one side is shown in FIG. 1), a carcass 22 that bridges between the bead portions 12, a tire side portion 14 that links between the bead portion 12 and a tread portion 16, and a side-reinforcing rubber 26 that serves as a side reinforcement layer.

A bead core 18 is embedded in each of the pair of bead portions 12. The carcass 22 extends between the pair of bead cores 18. Each end portion side of the carcass 22 is anchored by the bead core 18. In the present exemplary embodiment, as an example, the end portion side of the carcass 22 is folded back around the bead core 18 from the tire inner side to the tire outer side and anchored, and an end portion 22C of a folded-back portion 22B thereof is in contact with a carcass main body portion 22A. The carcass 22 extends in a toroidal shape from one of the bead cores 18 to the other of the bead cores 18 to structure a framework of the tire. Although the one end portion of the carcass 22 and the other end portion of the carcass 22 are folded back around the bead cores 18 and anchored in the present exemplary embodiment, this is not limiting. For example, a structure is possible in which plural bead core pieces are arranged at each bead portion 12 and the carcass 22 is sandwiched by the plural bead core pieces.

A belt layer 24A, a cap layer 24B and a layered layer 24C are each arranged at the tire radial direction outer side of the carcass main body portion 22A. The cap layer 24B covers the whole of the belt layer 24A, and the layered layer 24C covers end portion vicinities of the belt layer 24A. The structures of members that are used in conventional publicly known run-flat tires may be used for the carcass 22, the belt layer 24A, the cap layer 24B and the layered layer 24C.

A bead filler 20 is embedded in the bead portion 12. The bead filler 20 extends from the bead core 18 toward the tire radial direction outer side along an outer face 22O of the carcass 22. In the present exemplary embodiment, the bead filler 20 is disposed in a region that is enclosed between the carcass main body portion 22A and the folded-back portion 22B. The outer face 22O of the carcass 22 includes a face at the tire outer side of the carcass main body portion 22A and a face at the tire inner side of the folded-back portion 22B. In the present exemplary embodiment, an end portion 20A at the tire radial direction outer side of the bead filler 20 is inserted at the tire side portion 14. Thickness of the bead filler 20 decreases toward the tire radial direction outer side.

As shown in FIG. 1, a height BH of the bead filler 20 is set within a range from 30% to 50% of the tire section height SH, being set to, for example, 42% in the present exemplary embodiment. If the height BH of the bead filler 20 is greater than 50% of the tire section height SH, the tire side portion 14 is stiff and riding comfort deteriorates, and if the height BH of the bead filler 20 is less than 30% of the tire section height SH, run-flat endurance decreases. The term "height BH of the bead filler" used herein refers to a length measured in the tire radial direction from an intersection point between a line of extension of a bead seat and a line of extension of a bead base to the end portion 20A of the bead filler 20, in the state in which the tire 10 is assembled to the standard rim 30 and the internal pressure is set to the standard air pressure.

Most preferably, the height BH of the bead filler 20 is set within the range from 30% to 50% of the tire section height SH, and the end portion 20A of the bead filler 20 is disposed at the tire radial direction inner side relative to a maximum width position P of the carcass 22. The term "maximum width position P of the carcass 22" used herein refers to a position in the tire radial direction at which a distance in the tire width direction between the carcass 22 at one side of the tire 10 and the carcass 22 at the other side of the tire 10 is widest. The maximum width position P is disposed at the tire radial direction outer side relative to a position Q that is at 40% of the tire section height SH.

The side-reinforcing rubber 26 is disposed at the tire side portion 14, at the tire axial direction inner side of the carcass 22. The side-reinforcing rubber 26 reinforces the tire side portion 14. The side-reinforcing rubber 26 extends in the tire radial direction along an inner face 22I of the carcass 22. The side-reinforcing rubber 26 is formed in a shape whose thickness decreases toward the side at which the bead core 18 is disposed and toward the side at which the tread portion 16 is disposed, for example, substantially in a crescent shape.

An end portion 26A of the side-reinforcing rubber 26 at the side thereof at which the tread portion 16 is disposed overlaps with the tread portion 16, sandwiching the carcass 22 (the carcass main body portion 22A) therebetween. An end portion 26B of the side-reinforcing rubber 26 at the side thereof at which the bead core 18 is disposed overlaps with the bead filler 20, sandwiching the carcass 22 therebetween. The side-reinforcing rubber 26 is formed of a stiff rubber and is a rubber member for enabling running over a predetermined distance in a state of supporting the weight of the vehicle and vehicle occupants when the internal pressure of the tire 10 has fallen due to a puncture or the like.

Herein, a thickness GB of the side-reinforcing rubber 26 at the position Q that is at 40% of the tire section height (section height) is set to a thickness that is not more than 65% of a thickness GA of the side-reinforcing rubber 26 at the carcass maximum width position P. The term "thickness of the side-reinforcing rubber" used herein refers to a length of the side-reinforcing rubber 26 along a straight line drawn perpendicularly from an inner face of the side-reinforcing rubber 26 to the carcass, in the state in which the tire 10 is assembled to the standard rim 30 and the internal pressure is set to the standard air pressure.

The thickness GB of the side-reinforcing rubber 26 is set to a thickness that is not more than 40% of an overall thickness SB of the tire side portion 14 at the position Q at 40% of the tire section height SH. Further, the overall thickness SB of the tire side portion 14 at position Q at 40% of the tire section height SH is set to a thickness that is from 90% to 110% of an overall thickness SA of the tire side portion 14 at the carcass maximum width position P. The term "overall thickness SB of the tire side portion 14" used herein refers to a length of the side-reinforcing rubber 26 along a straight line drawn perpendicularly from the inner face of the side-reinforcing rubber 26 to an outer periphery face of the tire side portion 14.

In the present exemplary embodiment, the arrangement of the side-reinforcing rubber whose principal component is rubber is not particularly limited and the side-reinforcing rubber may be formed of an alternative material; for example, being formed with a thermoplastic resin or the like as a principal component. Furthermore, the side-reinforcing rubber 26 is formed of a single kind of rubber member but this is not limiting; the side-reinforcing rubber 26 may be formed of plural rubber members. Provided the side-reinforcing rubber 26 includes a rubber member as a principal component, the side-reinforcing rubber 26 may also include materials such as a filler, short fibers, resin or the like. A rubber member that structures the tire width direction outer side relative to the side-reinforcing rubber 26 and the carcass 22 may include, for example, a rubber member with the characteristics that a JIS hardness measured at 20° C. using a durometer hardness tester is 70-85 and a loss coefficient tan δ measured using a viscoelasticity spectrometer (for example, a spectrometer fabricated by TOYO SEIKI SEI-SAKUSHO) is not more than 0.10 under conditions of a frequency of 20 Hz, an initial strain of 10%, a dynamic strain of ±2%, and a temperature of 60° C.

An inner liner, which is not shown in the drawings, is arranged over the inner face of the side-reinforcing rubber 26 from the one of the bead portions 12 to the other of the bead portions 12. In the present exemplary embodiment, as an example, the inner liner that is arranged has butyl rubber as a principal component, but this is not limiting; an alternative rubber member, a resin or the like may be the principal component. In the present exemplary embodiment, a single layer of the side-reinforcing rubber 26 is sandwiched between the inner liner and the carcass 22, but this is not limiting. For example, a separate carcass may be disposed between the inner liner and the carcass 22, and the side-reinforcing rubber 26 may be divided.

A distance in the tire radial direction between a lower end portion of the bead core 18 and a lower end portion of the side-reinforcing rubber 26 in this structure is preferably set from 50% to 80% of the height of the bead filler 20. In the present exemplary embodiment, for example, this distance is set to 65%. If the distance is greater than 80%, run-flat running characteristics deteriorate, and if the distance is less than 50%, riding comfort deteriorates.

Because the present exemplary embodiment is applied to the tire 10 that has a large tire section height SH, no rim guard (rim protection) is provided, but this is not limiting; a rim guard may be provided.

—Operation and Effects—

Figure 2:
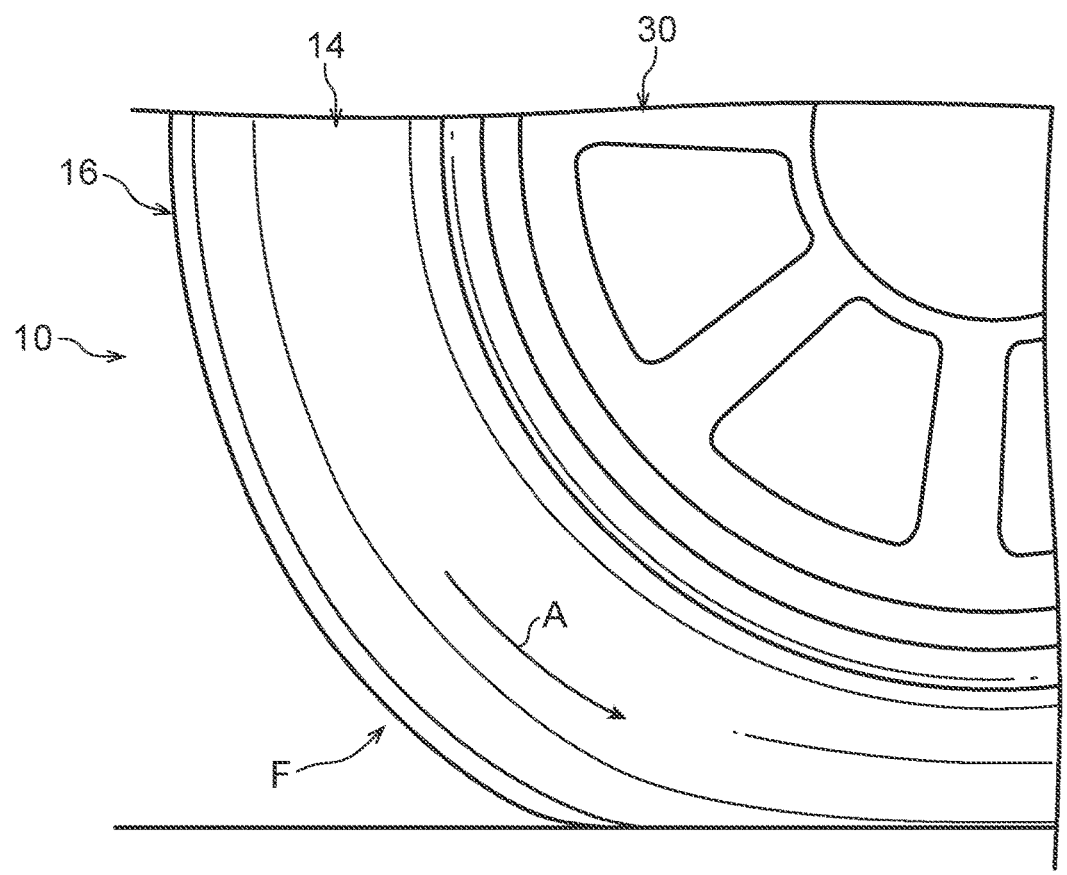
FIG. 2 is a tire side view in which the run-flat tire shown in FIG. 1 is viewed in the tire axial direction in a running state.

Now, operation and effects of the tire 10 according to the present exemplary embodiment are described. As shown in FIG. 2, during run-flat running, the contact patch of the tire 10 is in a greatly warped state. In this state, when a slip angle is applied by cornering, the warping is transmitted to the progress direction front side of the tire 10, and a contact entry side area F goes into a greatly warped state (the arrow in FIG. 2 shows the tire rotation direction). As a result, the tire side portion 14 that is disposed at the steering inner side of the vehicle buckles to the inner side of the tire 10, and buckling occurs.

Figure 4:
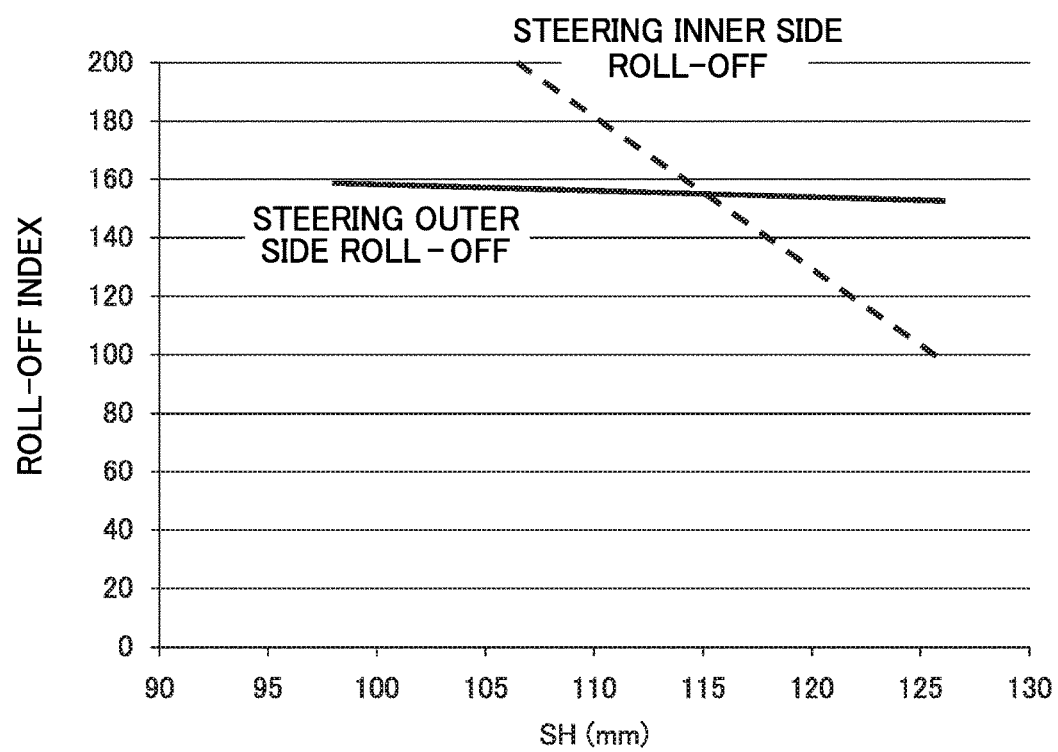
FIG. 4 is a graph showing a relationship between a roll-off index at a steering inner side of a vehicle and the roll-off index at the steering outer side.

It has been verified that, when the tire section height SH is 115 mm or greater, buckling tends to occur more at a tire that is disposed at the steering inner side. In the graph shown in FIG. 4, a roll-off index is measured in relation to the tire section height SH using run-flat tires in which the tire width is 215 mm and the tire section height SH is varied. The term "roll-off" used herein refers to roll-off that is caused through buckling. The greater the value of the roll-off index, the less likely buckling is to occur. From FIG. 4, it can be seen that the greater the tire section height SH, the smaller the value of the roll-off index at the steering inner side, and that buckling is more likely to occur than the steering outer side when the tire section height SH is 115 mm or greater.

Figure 3:
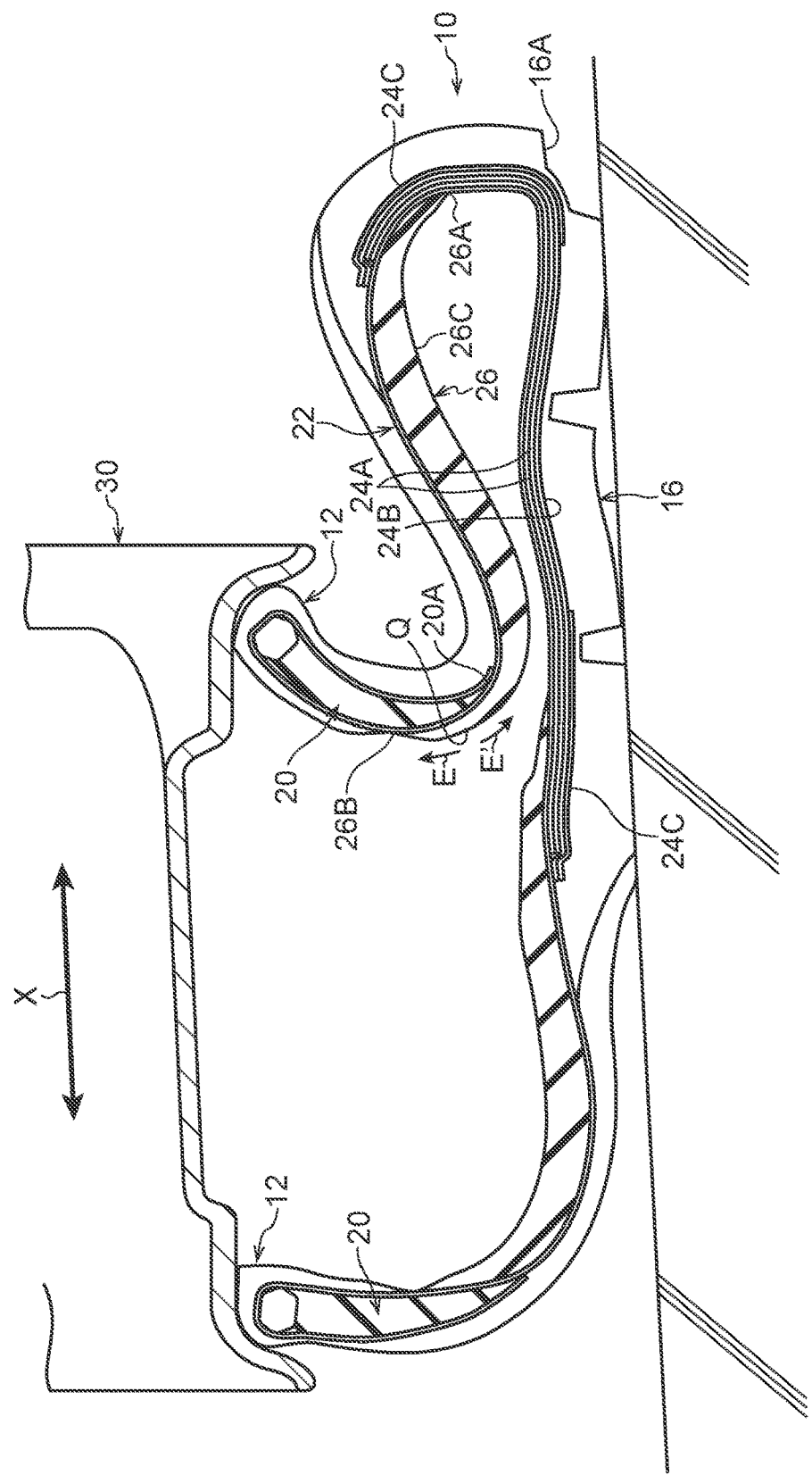
FIG. 3 is a tire sectional diagram showing a section in which the run-flat tire shown in FIG. 1 is cut along the tire axial direction in a state in which a tire side portion is buckled.

As shown in FIG. 3, when buckling occurs at the tire side portion 14, a tension force or compression force acts on an inner face 26C of the side-reinforcing rubber 26. The tension force acts in the direction of arrows E and E in the vicinity of position Q at 40% of the tire section height SH. Consequently, the tension force tends to be large at position Q at 40% of the tire section height SH. In the present exemplary embodiment, because the thickness GB of the side-reinforcing rubber 26 at position Q is set to a thickness that is not more than 65% of the thickness GA of the side-reinforcing rubber 26 at the carcass maximum width position P, the tension force acting on the side-reinforcing rubber 26 may be greatly reduced. Therefore, durability of the side-reinforcing rubber 26 may be improved. That is, run-flat endurance may be improved and damage to the side-reinforcing rubber 26 may be suppressed.

If the thickness of the side-reinforcing rubber 26 were excessively thin, it would be necessary to make the bead filler 20 thicker in order to assure run-flat endurance, the tire side portion 14 would be stiffer, and riding comfort would deteriorate. Therefore, it is preferable to form the thickness GB of the side-reinforcing rubber 26 at position Q at 40% of the tire section height SH to be a thickness that is at least 10% of the thickness GA of the side-reinforcing rubber 26 at the carcass maximum width position P.

The thickness GB of the side-reinforcing rubber 26 at position Q at 40% of the tire section height SH is set to 40% or less of the overall thickness SB of the tire side portion 14. Thus, portions of the tire side portion 14 other than the side-reinforcing portion may be made thicker, buckling curvature may be moderated, and tension forces acting on the side-reinforcing rubber 26 when buckling occurs may be suppressed.

In the tire 10, the overall thickness SB of the tire side portion 14 at position Q at 40% of the tire section height SH is set to a thickness that is from 90% to 110% of the overall thickness SA of the tire side portion 14 at the carcass maximum width position P. Therefore, an excessive increase in weight of the tire 10 may be suppressed even while run-flat endurance is assured.

In the present exemplary embodiment, as shown in FIG. 1, the side-reinforcing rubber 26 is constituted of one type of rubber, but the present invention is not limited to this structure; the side-reinforcing rubber 26 may be constituted of plural types of rubber. For example, the side-reinforcing rubber 26 may have a structure in which plural different types of rubber are superposed in the tire radial direction, and the side-reinforcing rubber 26 may have a structure in which plural different types of rubber are superposed in the tire axial direction. If the side-reinforcing rubber 26 has a structure in which plural different types of rubber are superposed in the tire radial direction, the effects of the present invention may be obtained provided the thickness of the side-reinforcing rubber 26 at position Q at 40% of the tire section height SH is set to a thickness that is not more than 65% of the thickness of the side-reinforcing rubber 26 at the carcass maximum width position P.

Hereabove, the present invention has been described in accordance with the present exemplary embodiment, but the present invention is not limited by this exemplary embodiment. It will be clear that numerous modes may be embodied within a technical scope not departing from the gist of the present invention.

—Experimental Example—

In order to verify the effects of the present invention, eight kinds of run-flat tire (below referred to simply as tires) encompassed by the present invention (below referred to as Examples 1 to 8) and five kinds of comparative example tire not encompassed by the present invention (below referred to as Comparative Examples 1 to 5) were prepared and evaluated as follows.

First, the tires of Examples 1 to 3 and the tires of Comparative Examples 1 and 2 used in the evaluations are described. The sizes of the tires used in the evaluations were all 215/60R17. The tires of Examples 1 to 3 all employed structures similar to the structure of the tire 10 according to the present exemplary embodiment described above but with respectively different thicknesses of the side-reinforcing rubbers. The tires of Comparative Examples 1 and 2 had similar structures to the tires of Examples 1 to 3, but the thicknesses of the side-reinforcing rubbers at the position at 40% of the tire section height SH were not encompassed by the present invention. Various quantitative values of Examples 1 to 3 and Comparative Examples 1 and 2 are shown in Table 1.

A cracking characteristic of the side-reinforcing rubbers was evaluated using the tires of Examples 1 to 3 and Comparative Examples 1 and 2 described above. In this evaluation, a maximum value of in-plane principal strain at the inner face of each side-reinforcing rubber was calculated by a simulation using the finite element method and represented by an index for which the maximum value of in-plane principal strain of Comparative Example 1 is used as a reference value (100). In Table 1 below, the ratio GB/GA is varied. In Table 2, the ratio GB/SB is varied. In Table 3, the ratio SB/SA is varied.

TABLE 1

|  |  | Comparative Example 1 | Comparative Example 2 | Example 1 | Example 2 | Example 3 |
|---|---|---|---|---|---|---|
| At height of 40% of SH | Thickness of side-reinforcing rubber GB (mm) | 6.2 | 5.0 | 3.7 | 2.5 | 1.2 |
|  | Overall thickness of tire side portion SB (mm) | 12.4 | 12.4 | 12.4 | 12.4 | 12.4 |
| At height of carcass maximum width | Thickness of side-reinforcing rubber GA (mm) | 7.8 | 7.6 | 5.7 | 5.0 | 3.9 |
|  | Overall thickness of tire side portion SA (mm) | 13.1 | 13.1 | 13.1 | 13.1 | 13.1 |
|  | GB/SB | 50% | 40% | 30% | 20% | 10% |
|  | GB/GA | 79% | 66% | 65% | 50% | 31% |
|  | SB/SA | 95% | 95% | 95% | 95% | 95% |
| Result | Cracking resistance of side-reinforcing rubber | 100 | 97 | 82 | 58 | 20 |

As is shown in Table 1, in Comparative Example 2 the ratio of the thickness GB of the side-reinforcing rubber at the position at 40% of the tire section height SH to the thickness GA of the side-reinforcing rubber at the carcass maximum width position was 66%. In contrast, in Example 1, GB/GA was 65% and the cracking characteristic of the side-reinforcing rubber was greatly improved. In Example 2 and Example 3, in which GB/GA was smaller than in Example 1, it can be seen that the cracking characteristic of the side-reinforcing rubber was even further improved.

TABLE 2

|  |  | Comparative Example 3 | Example 4 | Example 5 |
|---|---|---|---|---|
| At height of 40% of SH | Thickness of side-reinforcing rubber GB (mm) | 5.0 | 5.0 | 5.0 |
|  | Overall thickness of tire side portion SB (mm) | 11.0 | 12.4 | 13.5 |
| At height of carcass maximum width | Thickness of side-reinforcing rubber GA (mm) | 7.7 | 7.7 | 7.7 |
|  | Overall thickness of tire side portion SA (mm) | 11.6 | 13.1 | 14.2 |
|  | GB/SB | 45% | 40% | 37% |
|  | GB/GA | 65% | 65% | 65% |
|  | SB/SA | 95% | 95% | 95% |
| Result | Cracking characteristic of side-reinforcing rubber | 100 | 80 | 75 |

As shown in Table 2, in the tires of Examples 4 and 5, the thickness GB of the side-reinforcing rubber at the position at 40% of the tire section height was not more than 40% of the overall thickness SB of the tire side portion. Hence, in contrast with Comparative Example 3 in which GB/SB was larger than 40% at 45%, the cracking characteristic of the side-reinforcing rubber was improved.

TABLE 3

|  |  | Comparative Example 4 | Comparative Example 5 | Example 6 | Example 7 | Example 8 |
|---|---|---|---|---|---|---|
| At height of 40% of SH | Thickness of side-reinforcing rubber GB (mm) | 5.0 | 5.0 | 5.0 | 5.0 | 5.0 |
|  | Overall thickness of tire side portion SB (mm) | 12.1 | 12.4 | 13.1 | 15.2 | 15.6 |
| At height of carcass maximum width | Thickness of side-reinforcing rubber GA (mm) | 7.7 | 7.7 | 7.7 | 7.7 | 7.7 |
|  | Overall thickness of tire side portion SA (mm) | 13.8 | 13.8 | 13.8 | 13.8 | 13.8 |

TABLE 3-continued

|  |  | Comparative Example 4 | Comparative Example 5 | Example 6 | Example 7 | Example 8 |
|---|---|---|---|---|---|---|
| Results | GB/SB | 41% | 40% | 38% | 33% | 32% |
|  | GB/GA | 65% | 65% | 65% | 65% | 65% |
|  | SB/SA | 88% | 90% | 95% | 110% | 113% |
|  | Run-flat endurance | 99.6 | 100.0 | 100.4 | 101.6 | 101.7 |
|  | Weight | 99.4 | 100.0 | 101.3 | 105.2 | 105.9 |

As shown in Table 3, in Examples 6 to 8, the overall thickness SB of the tire side portion at the position of 40% of the tire section height was set in the range from 90% to 110% of the overall thickness SA of the tire side portion at the carcass maximum width position. In contrast with Comparative Example 4 in which SB/SA was 88% and Comparative Example 5 in which SB/SA was 113%, run-flat endurance may be assured while an excessive increase in weight of the run-flat tire may be suppressed.

The disclosures of Japanese Patent Application No. 2014-013597 filed Jan. 25, 2014 are incorporated into the present specification by reference in their entirety.

All references, patent applications and technical specifications cited in the present specification are incorporated by reference into the present specification to the same extent as if the individual references, patent applications and technical specifications were specifically and individually recited as being incorporated by reference.

The invention claimed is:

1. A run-flat tire with a tire section height of at least 129 mm, the run-flat tire comprising:
a carcass bridging between a pair of bead portions;
a tire side portion that links the bead portions with a tread portion, a carcass maximum width position of the tire side portion, at which a width of the carcass is at a maximum, being disposed at the tire radial direction outer side relative to a position at 40% of the tire section height;
a side reinforcement layer provided at a tire width direction inner side of the carcass, a thickness of the side reinforcement layer at the position at 40% of the tire section height being at most 65% of a thickness thereof at the carcass maximum width position;
first and second tread circumferential grooves that are disposed in the tread portion and adjacent to each other such that a space between the first and second grooves is entirely on one side of a tire equatorial plane, the first groove being closer to the equatorial plane than the second groove;
a plurality of tread reinforcement layers disposed so that, as viewed from the tire radial direction, all of the tread reinforcement layers overlap with the second groove;
wherein a tire width direction most inner end, of a tread reinforcement layer that is disposed at a tire radial direction most outer side, is disposed in the space between the first and second grooves.

2. The run-flat tire according to claim 1, wherein the thickness of the side reinforcement layer at the position at 40% of the tire section height is at most 40% of an overall thickness of the tire side portion at the position at 40% of the tire section height.

3. The run-flat tire according to claim 1, wherein an overall thickness of the tire side portion at the position at 40% of the tire section height is from 90% to 110% of the overall thickness of the tire side portion at the carcass maximum width position.

4. The run-flat tire according to claim 2, wherein an overall thickness of the tire side portion at the position at 40% of the tire section height is from 90% to 110% of the overall thickness of the tire side portion at the carcass maximum width position.

5. The run-flat tire according to claim 1, wherein each bead portion comprises (1) a bead core such that each bead core is embedded in each bead portion, and (2) a bead filler such that each bead filler is embedded in each bead portion,
wherein the bead filler extends from the bead core toward the tire radial direction outer side along an outer face of the carcass, and wherein a height of the bead filler is within a range from 30% to 50% of the tire section height.

6. The run-flat tire according to claim 5, wherein an end portion of the bead filler is disposed at the tire radial direction inner side relative to the maximum width position of the carcass.

7. The run-flat tire according to claim 5, wherein a distance in the tire radial direction between a lower end portion of the bead core and a lower end portion of the side reinforcement layer is from 50% to 80% of the height of the bead filler.

8. The run-flat tire according to claim 1, wherein the side reinforcement layer comprises a rubber member that (1) structures the tire width direction outer side relative to the side reinforcement layer and the carcass, and (2) possess the characteristics that a JIS hardness measured at 20° C. using a durometer hardness tester is 70-85, and a loss coefficient tan δ measured using a viscoelasticity spectrometer is not more than 0.10 under conditions of a frequency of 20 Hz, an initial strain of 10%, a dynamic strain of ±2%, and a temperature of 60° C.

9. The run-flat tire according to claim 1, wherein a thickness of the side reinforcement layer at position at 40% of the tire section height, is formed to be a thickness that is at least 10% of the thickness of the side reinforcement layer at the carcass maximum width position.

10. A run-flat tire with a tire section height of at least 129 mm, the run-flat tire comprising:
a carcass bridging between a pair of bead portions;
a tire side portion that links the bead portions with a tread portion, a carcass maximum width position of the tire side portion, at which a width of the carcass is at a maximum, being disposed at the tire radial direction outer side relative to a position at 40% of the tire section height;
a side reinforcement layer provided at a tire width direction inner side of the carcass, a thickness of the side reinforcement layer at the position at 40% of the tire section height being at most 65% of a thickness thereof at the carcass maximum width position;

first and second tread circumferential grooves that are disposed in the tread portion and adjacent to each other such that a space between the first and second grooves is entirely on one side of a tire equatorial plane, the first groove being closer to the equatorial plane than the second groove;

a plurality of tread reinforcement layers disposed so that, as viewed from the tire radial direction, all of the tread reinforcement layers overlap with the second groove;

wherein a tire width direction most inner end, of a tread reinforcement layer that is disposed at a tire radial direction most outer side, is disposed in the space between the first and second grooves;

wherein each bead portion comprises (1) a bead core such that each bead core is embedded in each bead portion, and (2) a bead filler such that each bead filler is embedded in each bead portion;

wherein the bead filler extends from the bead core toward the tire radial direction outer side along an outer face of the carcass, and wherein a height of the bead filler is within a range from 30% to 50% of the tire section height;

wherein an end portion of the bead filler is disposed at the tire radial direction inner side relative to the maximum width position of the carcass; and wherein a distance in the tire radial direction between a lower end portion of the bead core and a lower end portion of the side reinforcement layer is from 50% to 80% of the height of the bead filler.

11. A run-flat tire with a tire section height of at least 129 mm, the run-flat tire comprising:

a carcass bridging between a pair of bead portions;

a tire side portion that links the bead portions with a tread portion, a carcass maximum width position of the tire side portion, at which a width of the carcass is at a maximum, being disposed at the tire radial direction outer side relative to a position at 40% of the tire section height;

a side reinforcement layer provided at a tire width direction inner side of the carcass, a thickness of the side reinforcement layer at the position at 40% of the tire section height being at most 65% of a thickness thereof at the carcass maximum width position;

first and second tread circumferential grooves that are disposed in the tread portion and adjacent to each other such that a space between the first and second grooves is entirely on one side of a tire equatorial plane, the first groove being closer to the equatorial plane than the second groove;

a plurality of tread reinforcement layers disposed so that, as viewed from the tire radial direction, all of the tread reinforcement layers overlap with the second groove;

wherein a tire width direction most inner end, of a tread reinforcement layer that is disposed at a tire radial direction most outer side, is disposed in the space between the first and second grooves;

wherein each bead portion comprises (1) a bead core such that each bead core is embedded in each bead portion, and (2) a bead filler such that each bead filler is embedded in each bead portion;

wherein the bead filler extends from the bead core toward the tire radial direction outer side along an outer face of the carcass, and wherein a height of the bead filler is within a range from 30% to 50% of the tire section height;

wherein an end portion of the bead filler is disposed at the tire radial direction inner side relative to the maximum width position of the carcass;

wherein a distance in the tire radial direction between a lower end portion of the bead core and a lower end portion of the side reinforcement layer is from 50% to 80% of the height of the bead filler;

wherein the side reinforcement layer comprises a rubber member that (1) structures the tire width direction outer side relative to the side reinforcement layer and the carcass, and (2) possess the characteristics that a JIS hardness measured at 20° C. using a durometer hardness tester is 70-85, and a loss coefficient tan δ measured using a viscoelasticity spectrometer is not more than 0.10 under conditions of a frequency of 20 Hz, an initial strain of 10%, a dynamic strain of ±2%, and a temperature of 60° C.; and wherein a thickness of the side reinforcement layer at position at 40% of the tire section height, is formed to be a thickness that is at least 10% of the thickness of the side reinforcement layer at the carcass maximum width position.

* * * * *